(12) United States Patent
Colton et al.

(10) Patent No.: US 6,423,381 B1
(45) Date of Patent: Jul. 23, 2002

(54) PROTECTIVE, TRANSPARENT UV CURABLE COATING METHOD

(76) Inventors: Martin Colton, 202 Williamburg Dr., Longmeadow, MA (US) 44106; Robert Batson, 6 Great Oak La., Newington, CT (US) 06111

( * ) Notice: Subject to any disclaimer, the term of this patent is extended or adjusted under 35 U.S.C. 154(b) by 0 days.

(21) Appl. No.: 09/709,534

(22) Filed: Nov. 13, 2000

Related U.S. Application Data

(60) Provisional application No. 60/164,818, filed on Nov. 12, 1999.

(51) Int. Cl.[7] .................................................. C08J 7/04
(52) U.S. Cl. ................... 427/510; 427/140; 427/142; 427/385.5; 427/388.1; 427/389.7; 427/393.6; 427/407.1; 427/407.2; 427/409; 427/496; 427/504; 427/551; 427/552; 427/553; 427/558; 427/559; 427/595
(58) Field of Search ................................ 427/496, 504, 427/508, 510, 551, 552, 553, 558, 559, 140, 142, 385.5, 388.1, 389.7, 393.6, 407.1, 407.2, 409, 595

(56) References Cited

U.S. PATENT DOCUMENTS

| | | | |
|---|---|---|---|
| 4,065,587 A | 12/1977 | Ting | 427/54 |
| 4,072,770 A | 2/1978 | Ting | 427/54 |
| 4,143,013 A | 3/1979 | Jenkinson et al. | 260/29.1 SB |
| 4,179,548 A | * 12/1979 | Schroeter et al. | 525/329 |
| 4,234,399 A | 11/1980 | McDowell et al. | 204/159.15 |
| 4,246,379 A | 1/1981 | Howard | 525/440 |
| 4,656,077 A | 4/1987 | Larimore et al. | |
| 5,140,054 A | * 8/1992 | Miller et al. | 522/31 |
| 5,677,050 A | * 10/1997 | Bilkadi et al. | 428/331 |
| 5,686,535 A | * 11/1997 | Erickson et al. | 525/314 |
| 5,968,096 A | 10/1999 | Whitson et al. | |
| 6,197,844 B1 | 3/2001 | Hamrock et al. | 522/167 |
| 6,312,484 B1 | 11/2001 | Chou et al. | 51/298 |

FOREIGN PATENT DOCUMENTS

WO   WO 98/11168   3/1998   ............ C09D/4/00

* cited by examiner

Primary Examiner—Bernard Pianalto
(74) Attorney, Agent, or Firm—Welsh & Flaxman LLC

(57) ABSTRACT

A method for applying a protective coating to a surface. The method is achieved by applying a radiation curable reactive coating material to the surface and exposing the applied coating to a source of light for a predetermined time and at a predetermined intensity to effect polymerization of the coating.

17 Claims, 4 Drawing Sheets

PROTECTIVE, TRANSPARENT UV CURABLE COATING METHOD

CROSS-REFERENCE TO RELATED APPLICATIONS

This U.S. Patent Application is based upon U.S. Provisional Patent Application Ser. No. 60/164,818, filed Nov. 12, 1999, and entitled "TRANSPARENT UV CURABLE SYSTEM".

BACKGROUND OF THE INVENTION

1. Field of the Invention

The invention relates to protective coating systems. More particularly, the invention relates to a rapid radiation curing, single-component, protective coating system which may be readily repaired for the removal of a variety of undesirable markings including; stains, colorants, scratching and gouging. In addition, the invention relates to a novel UV curable formula used in the coating system which is readily photopolymerized into a hard, durable, thermoset plastic coating.

2. Description of the Prior Art

Various coating techniques have been developed in the prior art for protecting and enhancing easily and regularly damaged surfaces. Unfortunately, prior art coating techniques have not fully addressed the commercial needs associated with protecting and enhancing valuable surfaces in an efficient and economical manner. In addition, many prior art coating products allow for the generation of toxic fumes and smoke when exposed to flames or severe heat, and may provide a safety hazard in public buildings and conveyances.

For example, many prior art coating systems employ solvent-based, high VOC content coating compositions. These coating compositions offer thin, brittle coatings which do not resist scratching, are not easily repaired and must be totally removed before reapplication.

Other current coatings are two-part meter-mix coatings such as epoxies or urethanes. The coatings require extensive surface preparation and curing time, have the presence of odors, and yellow or discolor with time and exposure to light and have a tendency to delaminate from the coated substrate with time.

Protective film coatings, which are placed on the surface to be protected as a thin plastic film, are also known in the prior art for protecting an underlying surface. However, these film coatings can be readily removed from the protected surface by simply lifting an edge and peeling the film from the underlying surface. Once removed from the underlying surface, the surface may be readily marred and otherwise defaced. In addition to removal, these films may be readily burned and shredded.

As such, a need exists for a coating system offering an economical, efficient, and reliable alternative to prior art coating techniques. The present invention provides such a coating system.

SUMMARY OF THE INVENTION

It is, therefore, an object of the present invention to provide a method for applying a protective coating to a surface. The method is achieved by applying a radiation curable reactive coating material to the surface and exposing the applied coating to a source of light for a predetermined time and at a predetermined intensity to effect polymerization of the coating.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
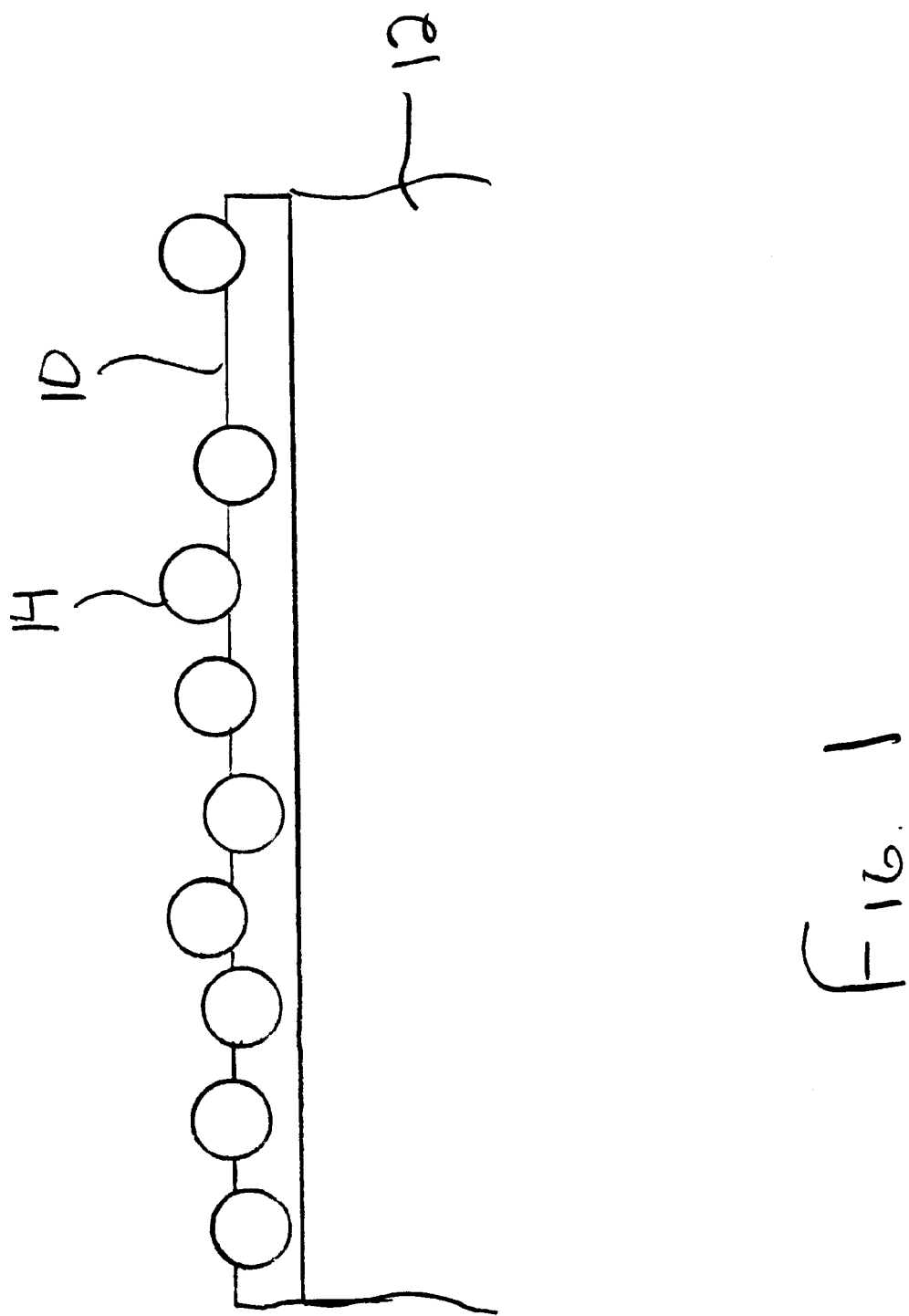
FIG. 1 is a cross section view of the present coating system applied as an anti-slip surface.

The detailed embodiments of the present invention are disclosed herein. it should he understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

The coating system in accordance with the present invention provides a transparent, hard, dry-to-the-touch coating which may be applied in thick or thin coatings to durable surfaces. The coating system provides protection from many solvent-based products, such as, inks, stains, alcohol, beverages, liquid soaps and paints. The coating system also protects underlying surfaces from scratching, abrading and/or discoloration.

The features of the present coating system are achieved by providing a coating material preferably composed of urethane acrylate oligomer resins blended together in various combinations to provide a very tough, hard and durable surface. The formulation of the present coating material permits its effective use at a multitude of viscosities. The variety of potential viscosities which may be used in accordance with the present invention permit the present coating system to be used for coating vertical and/or horizontal surfaces in a wide range of thicknesses from surface sealing to heavy pour coats.

Photopolymerization of the chemically reactive coating formulation is ensured by the addition of a variety of photoinitiators to the coating material in a manner which is discussed in greater detail below. Rapid curing is achieved through the application of wave energy, or radiation, curing. In accordance with a preferred embodiment, ultraviolet ("UV") and/or visible light photopolymerization are preferred modes. However, it is further contemplated that infrared wave energy may be utilized in conjunction with the photoinitiation for a variety of surface curing properties or as the total source of wave energy.

The curing technique used in accordance with a preferred embodiment of the present invention relies upon a combination of UV and visible light (as defined by wavelengths from 220 nanometers to 380 nanometers for UV and 380 nanometers to 480 nanometers for visible light). The combination of UV and visible light curing permits the use of cationic or free radical curing systems, or as a combination of both curing systems, as known to those skilled in the art and described in current commercial chemical literature.

This allows for extremely rapid curing, normally in seconds, of broad area coatings with minimal odor, heat, time and energy requirements. The present coating system's ability to produce a desirable coating with minimal odor, heat, time and energy requirements makes it highly suitable for industrial, commercial, as well as residential, areas.

In accordance with preferred embodiments of the present coating system, the coating material is composed of UV or visible light photoinitiator(s), urethane acrylate resin(s), acrylate and/or methacrylate monomer(s), wetting agents, UV absorbers and stabilizers, rheology modifier(s), stabilizer(s), adhesive agent(s), self leveling agent(s) and air release agent(s). The following chart outlines the preferred materials used in accordance with the present invention. This list merely presents a suggested shopping list from which the various ingredients of the present coating material may be obtained, and those of ordinary skill in the art will readily appreciate that the components making up the present coating material may be purchased from a variety of vendors without departing from the spirit of the present invention.

| Type | Product | Supplier |
|---|---|---|
| Photoinitiator | KT046 | Sartomer |
| | MBF | Rahn |
| | 184 | Ciba Geigy |
| | TPO | BASF |
| | A combination of photoinitiators combining UV and visible light energized initiators which are non-yellowing and promote both deep cure as well as surface cure are used | |
| Wetting agents | FC430 | 3M |
| | Byk 355 | Byk Chemie |
| | A-174 | Witco |
| UV absorbers | Tinuvin 1130 | Ciba Geigy |
| | Tinuvin 292 | Ciba Geigy |
| Leveling agent | 3500, 3503, 3505 | Witco |
| | Modflow 2000 | Monsanto |
| Air Release agent | Byk 550 | Byk Chemie |
| Stabilizers | Dequest 2010 | Monsanto |
| | Versonal | Dow |
| | EDTA | Aldrich |
| Adhesive agent | acrylic agent | Elf Atochem |
| | CD9051 ester | Sartomer |
| Rheology modifiers | r200 | Degussa |
| Fumed silica | HdkN20 | Wacker |
| | M-5 | Cabot |

In accordance with a preferred embodiment of the present invention, it has been found that ideal results are produced where the components of the present coating material are combined in the following manner; urethane acrylate 15–50% by weight, acrylate and/or methacrylate monomers 40–75% by weight, photoinitiators 3–7% by weight, UV absorbers 0.5–2.0% by weight, leveling agents 0.3–1%o by weight, stabilizers 0.01–0.05% by weight, adhesive agents 5–10% by weight, rheology modifiers 01–3% by weight, air release agents 0.1–0.5% by weight, and wetting agents 1–3% by weight.

The various components of the present coating material offer added functionality resulting in the highly useful coating system of the present invention. For example, the blending of several photoinitiators provides the coating system with full deep cure in thick sections. The blending of several photoinitiators also provides a surface cure resulting in a hard, scratch resistant surface while preventing surface distortion (wrinkling, depressions, soft spots).

In addition, the total coating system is formulated to prevent oxygen from inhibiting the ultimate curing of the coating material. The UV absorbers and stabilizers are blended to maximize the coating system's sunlight durability for clarity of appearance, UV protection of the substrate and non-yellowing of the coating. The blended resins provide a permanent, water-white clarity when cured, offering mar resistance, impact resistance, toughness and wear resistance. The selected monomers control the viscosity of the coating while minimizing the odor and maximizing toughness. The wetting agents provide humidity resistance, surface wetting and leveling properties to the coating system in conjunction with the leveling agents used. The air release agents allow entrapped air contained within the liquid coating during application to come to the surface and be release to avoid "pit marks". Finally, the adhesive agents provide adhesion for the bonding of the present coating system to various substrates including, but not limited to, metals, glasses, designer plastics (such as, CORIAN AND SWANSTONE), stone and marble.

In addition to the characteristics discussed above, the coating material may be modified to include gloss or matting agents imparting a stylized surface appearance of light reflective or absorbing capabilities, flame retardant chemicals to prevent flame spread or enhance other fire retardant qualities if required for regulatory compliance in specific applications, surface lubricants imparting a smoother, lubricated surface for increase wear and mar resistance in specific applications, compatible light transmitting pigments and or dyes imparting color or tint to the coating, a texture material imparting a texture to the coating to simulate textured finishes or provide increased hiding power and a mildewcide or biocide to prevent the formation of fungii or bacteria on the surface of the coating.

The various components of the coating material in accordance with the present invention include no VOC or HAPS related solvents, are environmentally friendly, and are not regulated in any form for use or transportation. In addition, the various components do not require special protective equipment other than that normally used with chemicals. In addition, the coating material may be readily formulated to provide a large range of viscosities to be used for thin coats and thicker coatings for interior and exterior applications on a multitude of surfaces. The coating material may also be pigmented or dyed to effect matching colors while not inhibiting the photopolymerization of the coatings. Being a thermoset plastic, the cured coating material offers good solvent, moisture and temperature resistance, provides a hard, durable surface and may be repaired and/or reapplied over the initial coating without the loss of aesthetic appeal or physical properties.

In use, the coating material, depending upon its viscosity, is simply brushed, rolled or sprayed onto surfaces in thicknesses from 1 mil to 40 mils. It may also be used as a "pour coat" by simply pouring it on horizontal surface and letting it spread and self level to form a glossy, thick coating. Where appropriate, the coating material is applied in conjunction with a diluted silane or ester primer to improve the adhesion and durability of the coating bond to the exposed surface of the desired substrate. The coating system may be cured using commercially available industrial radiation type lamps with appropriate "doped" bulbs to produce both UV and visible light in the desired wavelength spectrums which facilitate curing within seconds of exposure.

The durability, hardness and repairability of the present coating system make it an ideal protective coating for a wide variety of applications. Various contemplated uses are discussed below. However, the listed uses are merely exemplary of the possible uses for the present coating material and method. As such, those skilled in the art may appreciate other uses which are certainly considered to be within the scope of the present invention.

Frictional Surfacing Material

The coating material described above in accordance with the present invention offers frictional characteristics providing an anti-skid (non-slip) surface 10, while allowing the substrate material 12 to be visible through the transparent coating 10 (see FIG. 1). Where prior art coatings covered and hid the color and design of the substrate flooring material, or became easily discolored, marred or worn away, the present photopolymerizable coating system is readily transparent, non-yellowing and has good wear resistance when combined with grit, or a Lard particulate 14.

The frictional properties of the present photopolymerizable coating system, when used in conjunction with hard particulate placed on the surface of the coating, make it an ideal coating for slippery surfaces where water or other liquids and "slip" agents (oil, grease, soap, food waste) are commonly present. For example, it is contemplated that the present coating system may be applied to the smooth surfaces commonly found in pool/spa/shower areas, commercial kitchens, food processing areas, terrazzo/marble/granite floors in commercial lobbies, public transportation areas, bath tubs and bathroom floors in public accommodations and lodgings.

The frictional properties of the coating system as enhanced by the addition of anti-slip particulate, such as, aluminum oxide powder on the coating material, converts previously smooth, glass-like and dangerous surfaces to highly slip-resistant surfaces without hiding the exposed surface of the coated substrate. Once applied, the coating system is easily cleaned with conventional methods. In addition, the coating system in accordance with the present invention may be readily repaired if damaged while maintaining its appearance both on the exterior and interior applications. This is achieved by the simple addition of new coating over the preexisting coating and distributing particulate to the recoating before curing. There is no need to remove the original coating for repair.

An anti-skid coating in accordance with the present invention is created by first applying the coating material described above to the surface to be coated and subsequently broadcasting a particulate material onto the coating material discussed above. The particulate material may be chosen from the group consisting of aluminum oxides, colored epoxy powders, silicon carbide, hard plastics, such as, granulated clear HDPE, quartz and granulated shell materials. While the disclosed particulate materials are contemplated for use in accordance with a preferred embodiment of the present invention, other particulate materials may be used on other durable flooring surfaces without departing from the spirit of the present invention.

As mention above, the particulate material is spread, that is, applied on the surface of the previously applied coating material, prior to cure to be adhered to the substrate surface by means of the coating. It is contemplated that the particulate should be applied at a rate of ¼ ounce to 2 ounces per sq. ft. depending on the specific gravity of the particulate and the desired aesthetic qualities. While a specific quantity of particulate is disclosed for use in accordance with the present invention, those skilled in the art will appreciate that this quantity may also be varied without departing from the spirit of the present invention.

Once the particulate is incorporated onto the coating material, the coating material is cured with the radiation curing lamps. Where the coating is applied in a small area, such as stair treads, hand held curing lamps are used, while caster mounted large curing lamps are used where the coating is applied to a large surface.

In accordance with a preferred embodiment of the present invention, the anti-skid coating is applied in the following manner:

1) Preparing the floor area by normally washing, rinsing and drying to remove, dirt, grease, wax or other surface contamination. In cases where damage is severe, sanding, buffing or other removal processes maybe necessary.

2) Applying a dilute solution of primer in solvent to the surface to create greater adhesion to certain substrates or improved long-term moisture resistance by wiping, rolling or brushing in a thin coat. Optional Step.

3) Allowing the solvent to "flash off".

4) Applying the present photopolymerizable coating material to the primed surface with a squeegee, notched tool, roller, brush. Similarly, the present photopolymerizable coating material may be applied by spraying or flooding and allow the coating material to self-level and release air, normally 10–15 minutes depending on temperature and thickness.

5) Applying particulate to the coated area by broadcasting, or other dispersion method, in the desired density.

6) Curing the coating with the radiation lamps for a sufficient period to effect total polymerization of the coating so that the surface is hard and dry to the touch and the particulate held firmly in place.

7) If any particulate is loose on the surface, vacuum or sweep away.

Application of the present coating system in this manner provides the treated surface with a high friction surface, minimizing the likelihood that one might slip and fall while in contact with the treated surface. In addition, the coating is transparent and does not alter the aesthetic appearance of the underlying surface. In addition to the speed of cure, the coating process lends itself to applications where access to an area must be maintained and sections may be coated in a systematic manner to allow use while coating proceeds, for example, in health care, public transportation, and commercial areas where hallways and stairways must be kept partially open. The coating further provides protection for the underlying surface in a manner discussed below in greater detail.

Glass Coating System

Figure 2:
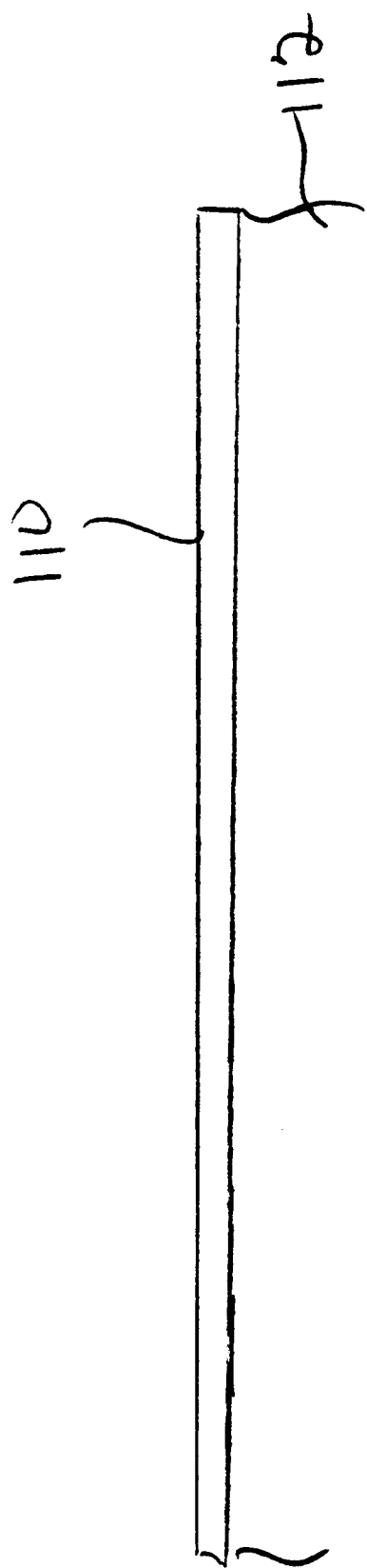
FIG. 2 is a cross section view of the present coating system applied as a glass coating system.

The coating system is also well suited for use as an impact resistant coating 110 on laminated or tempered glass 112 (see FIG. 2). When used in such applications, the coating system helps to prevent spalling of the laminated or tempered glass where the glass is impacted on the uncoated side and shattering of the impact area occurs, such as with a stone or other projectile hitting the glass.

In addition, the application of the present coating system to a glass surface reduces the repair/replacement time factor, and ultimate cost for damaged glass, due to vandalism caused by the scratching of designs and graffiti into the glass surface. Specifically, the coating system protects the glass surface by preventing the scratching of the glass itself, which would necessarily be replaced if scratched or otherwise defaced. The present coating system acts as a sacrificial coating which is scratched instead of the underlying glass surface. As compared with the glass surface itself, the hard, plastic coating is easily repaired by resurfacing the plastic coating to restore its transparency and gloss. The coating can be resurfaced by abrading, buffing and polishing numerous times to recover the transparency without having to recoat. In cases of extremely deep scratches after the coating has been resurfaced to the point Of reaching glass, recoating of the effected areas or of the entire glass surface can be accomplished, avoiding total glass replacement.

The coating material is applied to the laminated or tempered glass surface, which is designated as the surface to be protected, in the following manner:

1) The marred glass surface is prepared by sanding, sandblasting, honing or other surface preparation method to remove the objectionable defacement. This also allows for greater adhesion of the coating to a clean, prepared surface in that controlled abrasion increases the effective microscopic surface area several fold by increasing the surface roughness factor.

2) The prepared surface is then primed with a solvent-based dilution of a silane and/or methacrylate ester adhesion promotion agent by applying a thin uniform coating to the entire surface. The primer can be wiped, squeegeed or applied with other thin coating application methods. The solvent is allowed to evaporate (flash-off), leaving a very light coating of the active chemical ingredient which creates reactive sites for the chemical coating on the glass surface. In the case of silane, there is a well documented relationship of improved moisture and humidity resistance of silane prepared glass when used with coatings and adhesions over long periods of time.

3) The glass surface is then leveled to create a horizontal surface to prevent uneven thickness of the coating due to gravity. The photopolymerizable reactive chemical coating material is then applied by brush, roller spray method, draw rod or doctor blade.

4) The applied coating material is then allowed to self level and air release on the flat glass surface for 5–20 minutes. The coating thickness is normally 0.011 inches to 0.030 inches for the initial scratch resistant coating. The coating can also be spread with the use of a draw rod or doctor's blade using shims on the side of coating surface to act as thickness gauges. For example, such a system would have 0.025 inch thick guides on each side of the coating area and having a known weight of coating material poured onto the surface (2 oz per sq ft) and then using a glass draw rod to pull the material across the glass until the entire area is covered with the proper thickness plus a small amount of runoff. If air bubbles or irregularities in the coated surface appear, the use of heat from a hot air gun, radiation heating panel or actual torch flame will eliminate these problems by gently waving the heat source above the surface for a few seconds.

5) When the coated glass surface appearance and thickness are satisfactory, the surface is cured by exposure to radiation curing lamps equipped with the proper bulb type to generate the wave energy spectrum needed to effect full cure of the body of the coating as well as the surface. Experimentation has shown that two different radiation bulbs used in sequential exposure give optimum results, initial exposure is by a commercial "D" bulb (Fusion lamp bulb) which generates long wave energy in the 365 nanometers wavelength area for depth of cure followed immediately by exposure to an H bulb generating the majority of its wave energy in the 300–310 nanometers wave length spectrum. Curing takes 1–5 seconds under each lamp depending on depth or a total of 10 seconds for most applications to achieve full cure. The radiation cured coating is dry to the touch immediately and upon cooling to room temperature is ready for installation or packaging. Different bulbs for microwave and medium pressure mercury lamps provide the required spectral output with different intensities as defined in commercial literature.

With regard to vandals scratching or defacing glass on subway cars, buses, trains, terminals or building/store windows, etc., glass surfaces coated as discussed above may be readily repaired by simply sanding the initial coating until the defacement is removed and reapplying the new coating in the manner discussed above. Specifically, the hardness of the present coating system permits vandals to scratch graffiti into the coating but substantially prevents the vandals from scratching through the coating and into the glass itself. As a result, it is not necessary to replace an entire window once a vandal scratches graffiti thereon; it is only necessary to prepare the initial coating area affected by the vandalism by light sanding and reapply the coating thereon.

The present coating system works well with vandals because it is easier to scratch than glass and vandals are generally interested only in leaving their "tag" on the surface, not destroying the surface. This allows an easily repairable surface to be refinished faster and cheaper since the intended damage is cosmetic in nature and much less than on the hard glass.

Specifically, repair of scratched glass is achieved by buffing out the scratch, locally if possible, recoating the area and radiation curing the coating. Many times, light scratching or very localized scratching can be done with the glass in place in a vertical position (in situ). For deep scratches or full glass sanding, removal and horizontal working is easier and faster before recoating the entire surface.

For cosmetic covering of light scratches, recoating the area with a lower viscosity coating of the same type is possible by rolling with a hard roller to fill in the scratches. This does not require any sanding or refinishing.

Protective Coating Material

Figure 3:
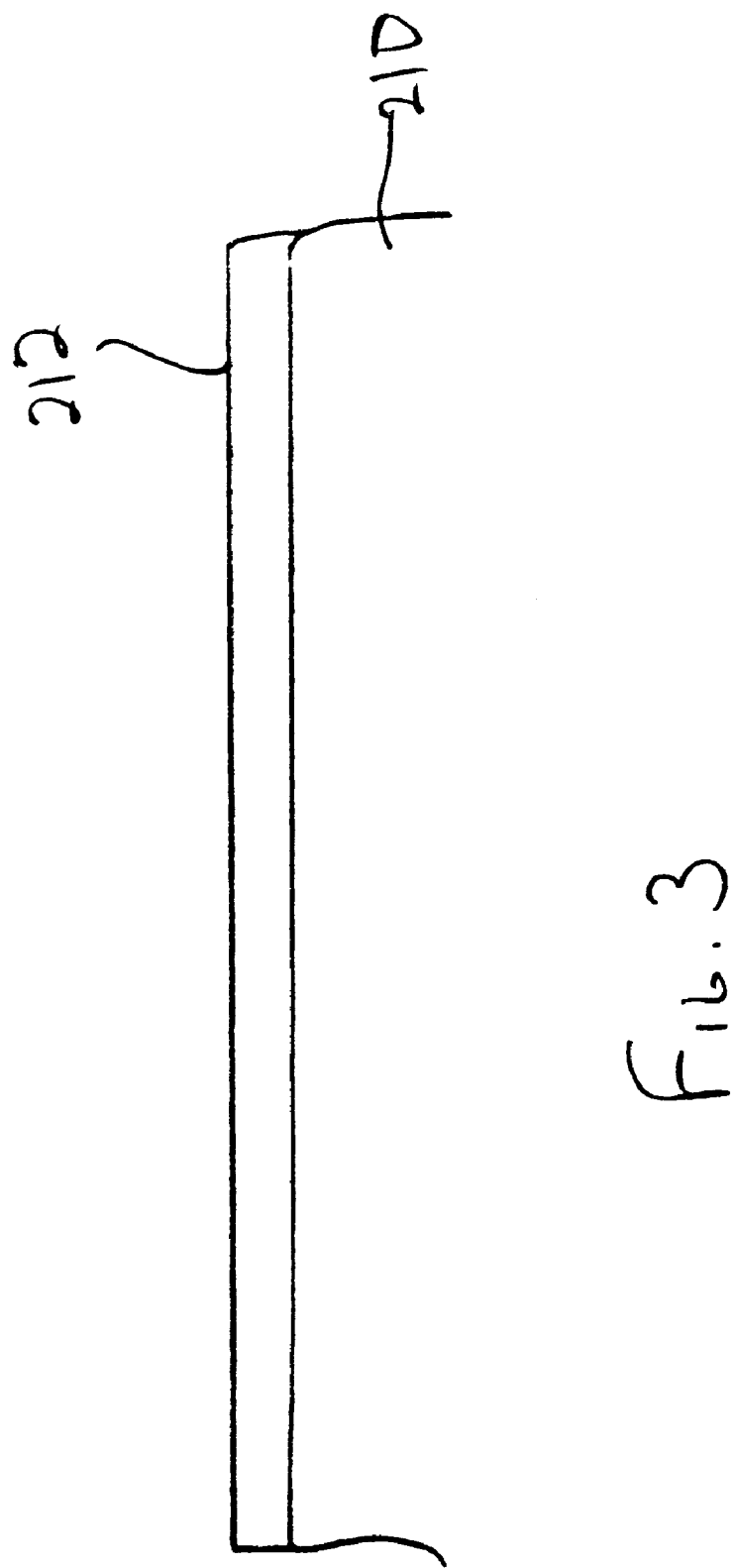
FIG. 3 is a cross section view of the present coating system applied as a protective coating.

The present coating system 212 may be further used to impart scratch and solvent resistance to various substrates 210 (see FIG. 3), such as, vanity tops of solid surfacing materials (for example, CORIAN by DuPont), marble, granite, ceramic tile and glass furniture. The coating system may also be used within shower and tub enclosures to prevent the buildup of mildew and soap residue on the wall surfaces and grout.

The coating system may further be applied to brass, bronze, anodized aluminum, and other decorative metal surface substrates to prevent scratching, oxidation (darkening and pitting and damage in their day-to-day use. For example, anodized aluminum luggage racks, brass hand rails, brass plated elevator doors and panels, and bronze plaques may be treated in accordance with the present invention to minimize the need for regular shining, polishing, deaning and replacing. While specific materials are proposed above for treatment in accordance with the present invention, those skilled in the art will appreciate the many other materials and objects which may be treated within the spirit of the present invention.

As briefly discussed in the Background of the Invention, prior art coating systems generally use highly solvated acrylic lacquers as sold in automotive shops in spray cans for spray application on these surfaces to prevent oxidation as well as corrosive attack from acid rain, human touch or other corrosive media. This acrylic technology is harmful to the atmosphere, is highly flammable and toxic, can not be used in enclosed spaces and leaves only a minimal coating on the surface providing pinholes for oxidation to occur. The present photopolymerizable reactive coating may be applied in many different ways, but creates an impervious barrier to moisture, humidity, human oils and residue while preventing scratching. The present coating material has no solvents, is nonflammable, is VOC compliant, and is easily cured in seconds to a hard, durable surface which is non yellowing and scratch resistant.

Despite the hardness and nonporous character of the present coating system, the present coating system may be damaged by scratching and abrasive wear. However, the present coating system substantially protects the underlying surface from scratches and oxidation, keeping it bright and shiny for prolonged periods of time. As a result, it is not necessary to replace an entire piece once it is damaged by scratching or abrasion; for example, it is only necessary to buff light scratches in the initially affected coating to restore the brilliance and to reapply the coating without removing the initial coating for heavy marine applications.

Coating and curing of large area substrates is normally done by spray equipment or rollers in thin coatings of 0.001 to 0.005 inches. For small areas the present coating material can be applied with brushes or wiping on. Once applied, the coating material self levels and air releases in seconds. The coating material is then cured with hand held lamps using several types of bulbs. Since the coating is so thin, the wavelength spectrum used to effect cure is not as important as with thicker coatings where wrinkling or distortion may occur.

Surfaces prepared in this manner are provided with a nonporous, durable and transparent coating which is not readily affected by damaging chemicals and scratching. Where the treated surface is damaged by scratching or marring, the underlying surface is protected and one need only reapply the coating to return the object to its original appearance. After several years of heavy use, the damaged surface is easily repaired by simply stripping off the initial coating with marine grade varnish remover, reapplying a new coating and curing in the manner discussed above.

Anti-graffiti System

Figure 4:
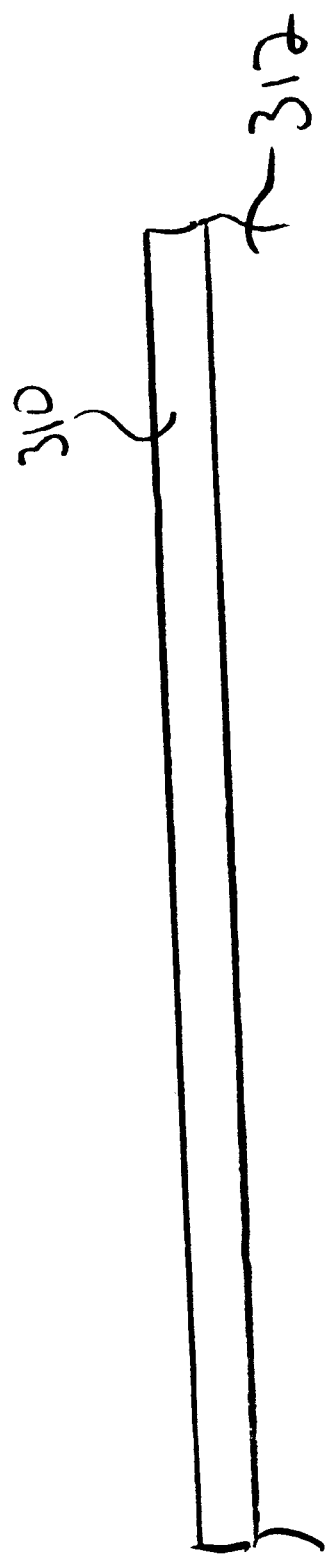
FIG. 4 is a cross section view of the present coating system applied as an anti-graffiti coating.

Finally, the coating system 310 may be applied to painted, plastic and porous surfaces 312 as an anti-graffiti coating based upon the solvent resistance and highly repairable nature of the coating system (see FIG. 4). Use in this manner enables the removal of permanent inks, paints, stains, and other types of graffiti by simply buffing, polishing and/or solvent wiping the treated surface. With this in mind, the present coating material may be applied to a variety of porous or solvable surfaces subjected to graffiti, for example, marble, granite, concrete, stone, thermoplastics, anodized aluminum.

These surfaces commonly absorb stains, ink, paint and colorants of all types into their surface structure, making removal therefrom extremely difficult, if not impossible. As briefly discussed above in the Background of the Invention, prior art coating techniques involve sandblasting the surface which removes a significant portion of the substrate and usually causes it to become even more porous and absorbing.

Another prior art method is overpainting the graffiti with a neutral paint to areas vandalized. This seals the surface but is unsightly, costly and creates a fresh canvas for the application of additional graffiti. Solvent washing to remove the graffiti stains is not effective because it causes the solvated stain to be absorbed into the surrounding unmarked area creating a larger area of discoloration but of lower color intensity. Physical means of removal may cause considerable physical damage to the substrate.

Other prior art techniques for new areas or reconditioned areas are by applying water based (emulsions)such as PTFE or dimethyl silicone, to create slippery, non-adhering surfaces, or with solvent-based dilutions of urethanes, acrylics, styrene acrylonitrile terpolymers, epoxies to seal the porous materials to prevent absorption and adhesion. Many of the solvents used in paint will easily penetrate such coating films. For example, silicones are useful only against water-based colorants and are ineffective against solvent based dyes and pigments carried in aromatic hydrocarbon solvents or oils. They have a limited life, they yellow, turn the substrate dark or have a glossy finish, they can be disturbed by water or solvents and they must be applied in repeated coats to get any significant buildup for long lasting protection.

These prior art coatings deposit only 5–40% of the volume of the coating after evaporation and are non-reactive so adhesion on smoother surfaces such as marble is very limited and solvent resistance is limited.

The present invention overcomes the disadvantages of previously known anti-graffiti protective coatings by providing an impervious, solvent-resistant thermoset plastic coating. The present coating system, by being 100% solids and chemically reactive, prevents entry of the graffiti colorants into the porous underlying surfaces which are very difficult and expensive to clean. The coating being a thermoset, crosslinked plastic has excellent solvent resistance and allows for strong cleaning agents to be used on it for removal of the graffiti without effecting the coating. The coating being transparent and capable of being matted with flattening agents or glossy with gloss agents can match the finish of the substrate.

The coating once applied and cured, forms an inert, transparent film within the porosity, and on the surface, which prevents permanent staining by almost all solvent carriers used in commercial inks, paints, stains which are common to graffiti users.

Once applied to a specific substrate, the present coating system may be repaired in a variety of ways after being affected by graffiti, such as, paints, spray cans, inks, nail polish etc. For example, where an ink or paint has created a stain on the surface of the coating system, the coating system may be cleaned with solvents; one such cleaner would be water, EPA and citrus based detergents, while another would be methylated spirits.

If solvents do not totally remove the stain, the effected area of the coating may be sanded away to remove the stain without damaging the porous substrate. The sanded portion of the coating is then replaced by the simple application and curing of the coating material. In fact, the viscosity of the coating material allows an individual to roll or spray the coating material on the sanded area, wait while the coating material self-levels and is absorbed into the outer porosity, and cure the coating material with small hand held UV lamps.

Where the coating is scratched, repair is achieved by sanding away the scratch coating and reapplying the coating in the same manner as discussed above with regard to the removal of a stain. Alternately, where the scratch permits, an individual may simply apply the coating material within the scratch, cure the coating material and lightly abrade, with super fine grit (400 micron or better), the newly applied coating until it conforms with the existing surface.

In summary, the many features of the present coating system offer a multitude of benefits to those in need of a protective coating. For example, the extremely fast curing rate of the present coating system provides limited downtime at commercial and residential properties, the low odor level of the coating material generates no residual odors that might be offensive to nearby individuals, and the hard, tough surface produced by the coating system is mar and solvent resistant. In addition, the high film integrity offered by the coating system provides impact resistance, while the low viscosity of the coating material results in thin coating thicknesses.

Additional benefits include a non-yellowing coating system providing outdoor color durability, a clear, transparent coating invisible on surfaces and a refractive index similar to glass making the coating system suitable for applications on glass. Finally, the coating system is solvent resistant allowing for use on countertops, vanities, and bathroom sink areas normally susceptible to various staining and marring materials used in cosmetics, body lotions, aftershave lotions, drinks, beverages (rings).

The present coating system provides a clear, hard, dry to the touch coating which may be applied in thick or thin coatings to durable surfaces for providing protection from solvents, scratching or discoloration. The coating system may be applied to a variety of surfaces, either horizontally or vertically oriented, and is easily applied, repaired and cleaned to maintain the desired appearance of the coated substrate. The coating system protects new surfaces, restores damaged surfaces or adds safety to potentially dangerous slippery surfaces. These applications are found in commercial buildings, such as, hotels, banks, restaurants, banks, transportation terminals, convention centers, residential buildings, such as, homes, health care facilities of nursing homes, hospitals, clinics, spas, health clubs, exercise clubs and industrial buildings, such as, plant showrooms and lobbies.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for applying a protective coating to a surface, comprising:

applying a radiation curable reactive coating material to the surface, wherein the coating material consists essentially of a light photoinitiator, a urethane acrylate resin comprising 15–50% by weight, an actylate monomer comprises 40–75% by weight, a wetting agent, a UV absorber and stabilizer, a rheology modifier, a stabilizer, an adhesive agent, and a self leveling agent; and exposing the applied coating to a source of light for a predetermined time and at a predetermined intensity to effect polymerization of the coating.

2. The method according to claim 1, wherein the surface is glass.

3. The method according to claim 1, wherein the surface is marble.

4. The method according to claim 1, wherein the surface is a metal.

5. The method according to claim 1, wherein the surface is a solid surfacing material.

6. The method according to claim 1, wherein the surface is a granite.

7. The method according to claim 1, wherein the surface is a ceramic tile.

8. The method according to claim 1, wherein the wetting agent comprises 1–3% by weight.

9. The method according to claim 1, wherein the photoinitiator is a UV photoinitiator.

10. The method according to claim 1, wherein the method includes the additional step of repairing the surface by reapplying and curing the radiation curable reactive coating material.

11. The method according to claim 10 wherein the step of reapplying and curing includes removing the original coating prior to reapplying and curing subsequently coating of the radiation curable reactive coating material.

12. The method according to claim 1, wherein the photoinitiator comprises 3–7% by weight.

13. The method according to claim 1, wherein the UV absorber comprises 0.5–2.0% by weight.

14. The method according to claim 1, wherein the leveling agents comprises 0.3–1% by weight.

15. The method according to claim 1, wherein the stabilizer comprises 0.01–0.05% by weight.

16. The method according to claim 1, wherein the adhesive agent comprises 5–10% by weight.

17. The method according to claim 1, wherein the rheology modifier comprises 01–3% by weight.

* * * * *